(12) United States Patent
Wai

(10) Patent No.: US 7,730,360 B1
(45) Date of Patent: Jun. 1, 2010

(54) CDC-COMPLIANT EMBEDDED USB CONTROLLER COMMUNICATION DEVICE AND SYSTEM WITH CUSTOM FEATURES SUPPORT

(75) Inventor: Eddie Wai, Rowland Heights, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 732 days.

(21) Appl. No.: 11/647,784

(22) Filed: Dec. 29, 2006

(51) Int. Cl.
*G06F 11/00* (2006.01)

(52) U.S. Cl. .............................. 714/43; 714/25; 714/27; 714/30; 714/44; 710/313

(58) Field of Classification Search .................. 714/25, 714/37, 30, 39, 43, 45, 47, 49, 27, 44; 710/310, 710/313, 316
See application file for complete search history.

(56) References Cited

U.S. PATENT DOCUMENTS 6,829,726 B1 * 12/2004 Korhonen .................... 714/25

| | | | | |
|---|---|---|---|---|
| 7,257,741 B1 * | 8/2007 | Palenik et al. | .................. | 714/43 |
| 2003/0016770 A1 * | 1/2003 | Trans et al. | .................. | 375/346 |
| 2004/0024920 A1 * | 2/2004 | Gulick et al. | .................. | 710/1 |
| 2005/0268175 A1 * | 12/2005 | Park | ........................... | 714/43 |

\* cited by examiner

*Primary Examiner*—Robert Beausoliel
*Assistant Examiner*—Joseph D Manoskey
(74) *Attorney, Agent, or Firm*—Farjami & Farjami LLP

(57) ABSTRACT

There is provided a method of communicating diagnostic information between a Universal Serial Bus (USB) host and a USB device, the USB host including a host USB controller, a main driver and a host main application. The method comprises establishing a data pipe in a data class interface between the USB host and the USB device for data communication; establishing a diagnostic information pipe in the data class interface between the USB host and the USB device for diagnostic information communication; monitoring the data class interface between the host USB controller and the main driver using a filter driver; intercepting the diagnostic information in the diagnostic information pipe of the data class interface using the filter driver; directing the diagnostic information intercepted by the filter driver to a host diagnostics application; and directing the data in the data pipe of the data class interface to the main driver.

20 Claims, 4 Drawing Sheets

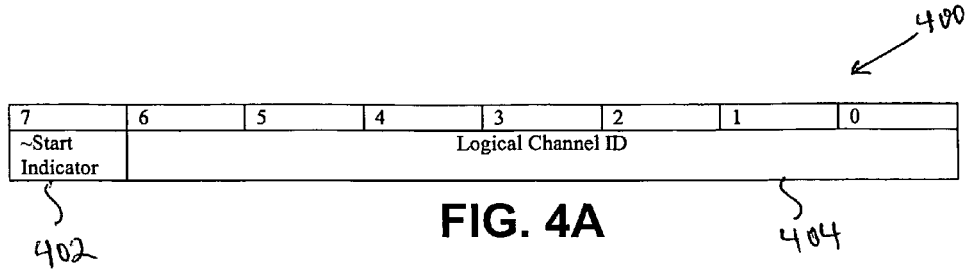
FIG. 4A
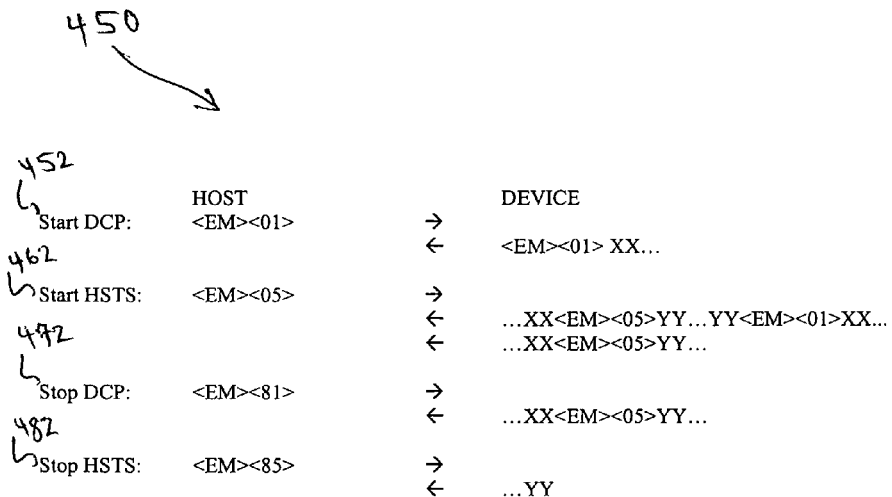
FIG. 4B
FIG. 4C

CDC-COMPLIANT EMBEDDED USB CONTROLLER COMMUNICATION DEVICE AND SYSTEM WITH CUSTOM FEATURES SUPPORT

BACKGROUND OF THE INVENTION

1. Field of the Invention

The present invention relates generally communication interface for communication devices. More particularly, the present invention relates to using Universal Serial Bus (USB) by communication devices having custom features support.

2. Background Art

USB is a serial bus standard for a device interface. USB was originally designed for computers, but its popularity has prompted its commonplace use with video game consoles, PDAs, portable DVDs and media players, cell phones, and even devices such as televisions, home stereo equipment and portable memory devices.

Today, an industry specification, titled "USB Class Definitions for Communication Devices," Version 1.1, dated Jan. 19, 1999, defines an architecture that is capable of supporting any communication device, which is hereby incorporated by reference in its entirety. As explained therein, there are three classes that make up the definition for communication devices: (1) Communication Device Class, (2) Communication Interface Class, and (3) Data Interface Class. The Communication Device Class is a device level definition and is used by the host to properly identify a communication device that may present several different types of interfaces. The Communication Interface Class defines a general-purpose mechanism that can be used to enable all types of communication services on USB. The Data Interface Class defines a general-purpose mechanism to enable bulk or isochronous transfer on the USB when the data does not meet the requirements for any other class.

A communication device has three basic responsibilities: (1) Device management, (2) Operational management, and (3) Data transmission. The device will use the Communication Class interface to perform device management and optionally for call management. The data streams are defined in terms of the USB class of data that is being transmitted. If there is no appropriate USB class, then designers can use the Data Class defined in the USB specification to model the data streams. Device management refers to the requests and notifications that control and configure the operational state of the device, as well as notify the host of events occurring on the device. Call management refers to a process that is responsible for the setting up and tearing down of calls. This same process also controls the operational parameters of the call. The term "call," and therefore "call management," describes processes that refer to a higher level of call control than those processes responsible for the physical connection. Data transmission is accomplished using interfaces in addition to the Communication Class interface. These interfaces can use any defined USB class or can be vendor-specific.

The Communication Class interface is a management interface and is required of all communication devices. This interface is used for device management and, optionally, call management. Device management includes the requests that manage the operational state of the device, the device responses, and event notifications. Call management includes the requests for setting up and tearing down calls, and the managing of their operational parameters. The Communication Class defines a Communication Class interface consisting of a management element and optionally a notification element. The management element configures and controls the device, and includes endpoint 0. The notification element transports events to the host, and in most cases, includes an interrupt endpoint. Notification elements pass messages via an interrupt or bulk endpoint, using a standardized format. Messages are formatted as a standardized 8-byte header, followed by a variable-length data field. The header identifies the kind of notification, and the interface associated with the notification; it also indicates the length of the variable length portion of the message.

The Data Class interface can be used to transport data whose structure and usage is not defined by any other class, such as audio. The format of the data moving over this interface can be identified using the associated Communication Class interface. The Data Class defines a data interface as an interface with a class type of Data Class. Data transmission on a communication device is not restricted to interfaces using the Data Class. Rather, a data interface is used to transmit and/or receive data that is not defined by any other class.

FIG. 1 illustrates conventional abstract control model 100, including USB host 102 and USB device 104, where USB device 104 understands standard V.25ter (AT) commands. As shown, USB device 104 includes carrier modulation (datapump) 116, and controller 108 that handles the AT commands and relay controls. Conventional abstract control model 100 has host-device interface 101 that includes data class interface 110 and communication class interface 106, which are used by USB device 104 and USB host 102 for communication purposes. USB device 104 can also, at times, make use of class interfaces other than data class interface 110 and communication class interface 106, for example a device could use an Audio Class interface for the audio functions in a speakerphone. Communication class interface 106 may include two pipes, where one is used to implement the management element and the other to implement a notification element. In addition, USB device 104 can use two pipes to implement channels over which to carry unspecified data, typically over data class interface 110. For POTS (Plain Old Telephone Service) line control, abstract control model 100 will either support V.25ter commands embedded in the data stream, or V.25ter commands sent down communication class interface 106. When V.25ter commands are multiplexed in the data stream, the Heatherington Escape Sequence or the TIES method would define the only supported escape sequences.

Further, USB device 104 also includes Data Access Control (DAA) 118 for interfacing with the telephone line. Error correction 114 and data compression 112 are implemented in USB device 104. However, error correction 114 and data compression 112 could be implemented on USB host 102, and not necessarily on USB device 104. Also, V.25ter commands are used to control the POTS line interface. ITU Recommendation V.80 defines one way that USB host 102 can control USB device 104 data stream.

Although USB Class Definitions for Communication Devices (or USB CDC) provides a universal interface approach to ensure compatibility between communication devices and host devices, USB CDC introduces certain disadvantages and drawbacks. For example, USB CDC does not provide any support for custom features, such as communication of diagnostics information by USB device 104. As a result, in one conventional approach, USB device 104 manufacturers simply replace USB compliant CDC driver in USB host 102 with a USB custom or non-compliant CDC driver in order to accommodate custom features of USB device 104. Of course, such approach will eventually lead to interoperability and portability issues for USB device 104.

In another approach, USB device 104 uses data pipes of data class interface 110 for communication of information relating to custom features, such as diagnostic information, with USB host 102. In such approach, diagnostic information is embedded in the data stream that is passed by the CDC driver on USB host 102 to the host application, wherein the host application detects and retrieves the embedded diagnostic information. However, this approach utilizes the already-limited USB device 104 data bandwidth, and severely affects the data throughput. For example, if a modem device is provided a data bandwidth of 115 Kbps, transmission of the embedded diagnostic information will consume a portion of the data bandwidth, and adversely affects the modem data throughput.

Accordingly, there is a strong need in the art for a CDC compliant solution that can accommodate USB devices with custom features without adversely affecting the data pipes.

SUMMARY OF THE INVENTION

A USB controller communication device and system with custom features support, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4A illustrates a control byte definition for the diagnostic channel control of FIG. 3, according to one embodiment of the present invention;

FIG. 4B illustrates logical channel identifications for the control byte definition of FIG. 4A, according to one embodiment of the present invention; and FIG. 4C illustrates an example exchange between a USB host and a USB device, according to one embodiment of the present invention.

DETAILED DESCRIPTION OF THE INVENTION

Figure 1:
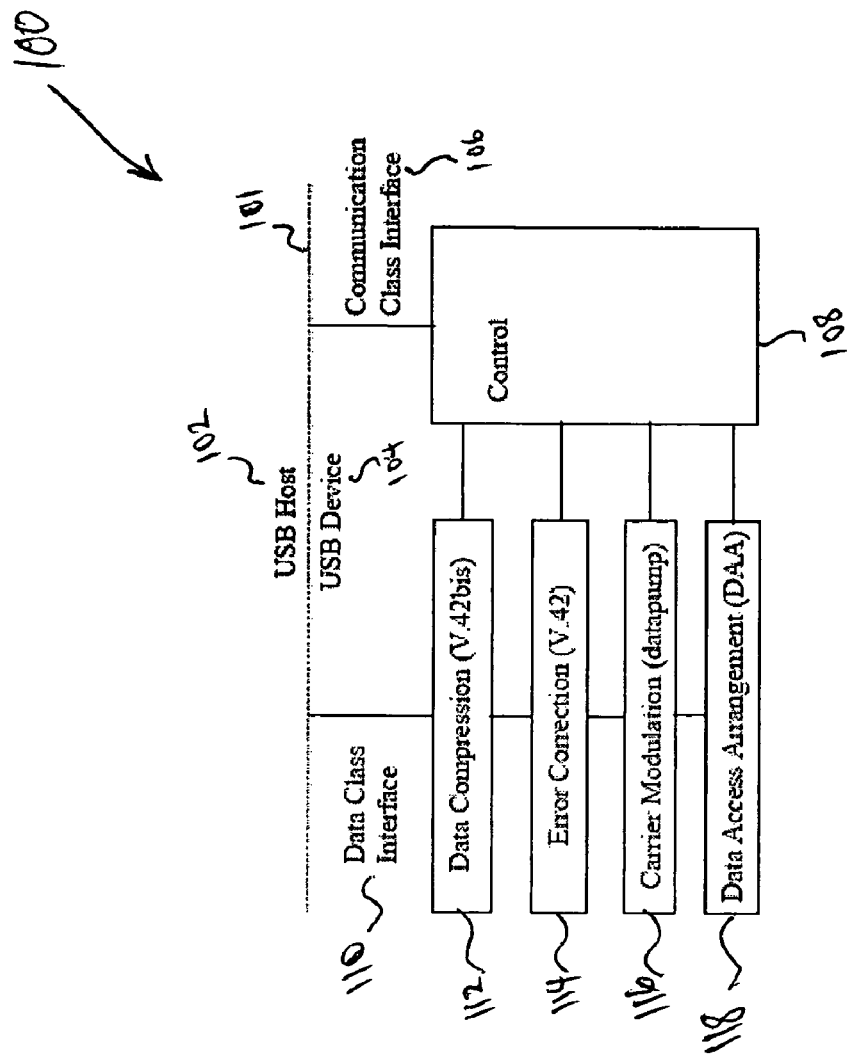
FIG. 1 illustrates a conventional abstract control model for USB systems.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
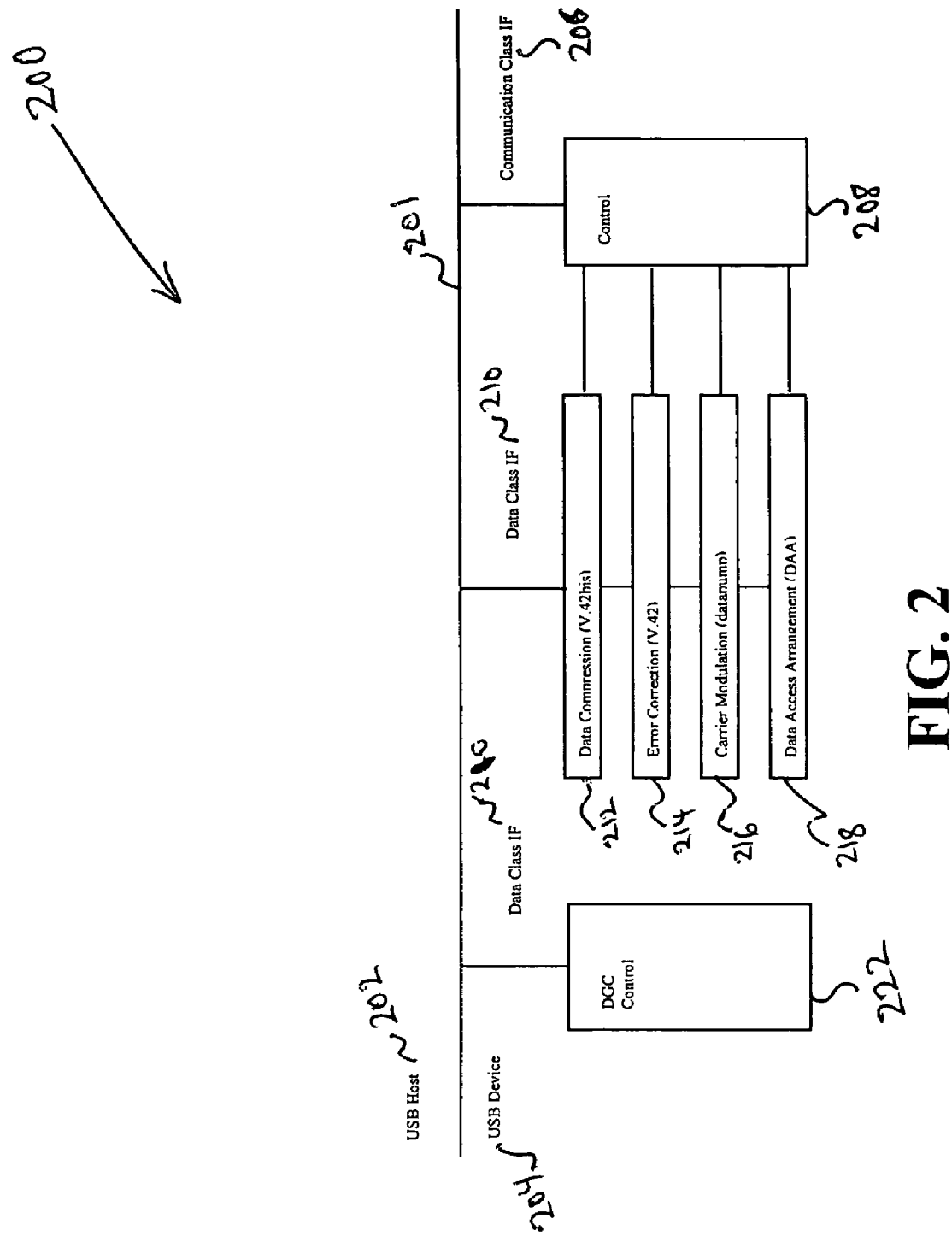
FIG. 2 illustrates an abstract control model for USB systems, including a diagnostic channel control, according to one embodiment of the present invention.

FIG. 2 illustrates abstract control model 200 for USB systems, according to one embodiment of the present invention. As shown, abstract control model 200 includes USB host 202 and USB device 204, where USB device 204 understands standard V.25ter (AT) commands. USB device 204 includes carrier modulation (datapump) 216, and controller 208 that handles the AT commands and relay controls. Abstract control model 200 also includes host-device interface 201 that includes data class interface 210 and communication class interface 206, which are used by USB device 204 and USB host 202 for communication purposes. USB device 204 can also, at times, make use of class interfaces other than data class interface 210 and communication class interface 206, for example a device could use an Audio Class interface for the audio functions in a speakerphone. Communication class interface 206 may include two pipes, where one is used to implement the management element and the other to implement a notification element. In addition, USB device 204 can use two pipes to implement channels over which to carry unspecified data, typically over data class interface 210. For POTS line control, abstract control model 200 will either support V.25ter commands embedded in the data stream, or V.25ter commands sent down communication class interface 206. When V.25ter commands are multiplexed in the data stream, the Heatherington Escape Sequence or the TIES method would define the only supported escape sequences.

Further, USB device 204 also includes Data Access Control (DAA) 218 for interfacing with the telephone line. Error correction 214 and data compression 212 are implemented in USB device 204. However, error correction 214 and data compression 212 could be implemented on USB host 202, and not necessarily on USB device 204. Also, V.25ter commands are used to control the POTS line interface. ITU Recommendation V.80 defines one way that USB host 202 can control USB device 204 data stream.

Unlike conventional abstract control model 100, USB device 204 of abstract control model 200 of the present invention also includes diagnostic channel (DGC) control 222. DGC control 222 uses data class interface 210 for communication with USB host 202. In one embodiment of the present invention, USB device 204 employs seven (7) endpoints for communication with USB host 202. Two endpoints allocated for default control pipes, e.g. endpoint 0 IN/OUT. One endpoint allocated for notification pipe via communication class interface 206, e.g. endpoint 1 IN. Two endpoints allocated for data pipes via data class interface 210, e.g. endpoint 2 IN/OUT. Two endpoints allocated for diagnostic channel pipes via data class interface 210, e.g. endpoint 3 IN/OUT. As such, in one embodiment, endpoint 3 IN/OUT will be configured to carry the diagnostic data traffic between USB device 204 and USB host 202. It should be noted that although the present invention is described in conjunction with an analog modem abstract model, the present invention can also be used in conjunction with other communication devices, such as audio devices, DSL devices, etc.

Figure 3:
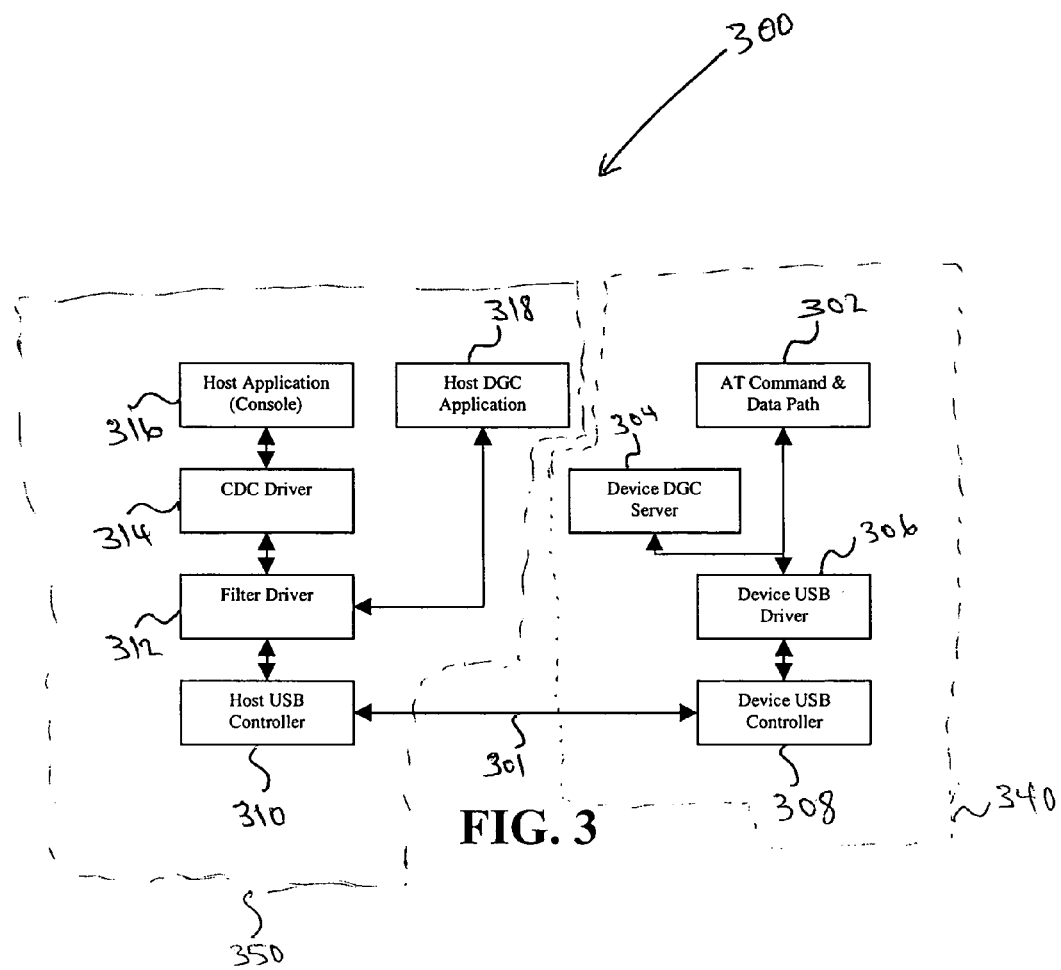
FIG. 3 illustrates a logical communication path for a USB system, including a diagnostic channel control, according to one embodiment of the present invention.

FIG. 3 illustrates a logical communication path for USB system 300, according to one embodiment of the present invention. As shown, USB device 340 includes AT command & data path 302, device DGC server 304, device USB driver 306 and device USB controller 308. Also, host 350 includes host USB controller 310, filter driver 312, CDC driver 314, host application (console) 316 and host DGC application 318. As described above, host 350 and USB device 340 communicate via host-device interface 301 using various endpoints through data class interface and communication class interface. Unlike conventional USB systems, USB system 300 includes device DGC server 304 at USB device 340, which can obtain, monitor, process and communicate diagnostic parameters and information via device USB driver 306, device USB controller 308 and host-device interface 301 with USB host 350. On the other hand, host 350 includes filter driver 312 interposed between host USB controller 310 and CDC driver 314 for intercepting diagnostic parameters and information from USB device 340 and directing such diagnostic parameters and information to host DGC application 318. Further, filter driver 312 allows any other information to pass through to CDC driver 314 for utilization by host application 316. In addition, filter driver 312 may communicate diagnostic related information to USB device 340 via host USB controller 310 and host-device interface 301 with USB device 340 for use by device DGC server 304.

Device DGC server 304 may support a number of diagnostic features, such as (i) digital call progress (DCP), which exerts 16 KHz×16 bit samples for routing to an audio driver, (ii) constellation eye pattern (or SoftEye), which exerts 16 KHz×16 bit samples (X-Y coordinates) for routing to host DGC application 318 for eye pattern display, (iii) memory read/write monitor (MemMon), which can be made throughout a modem handshake, in real time, for routing to the host DGC applications 318 for memory display, (iv) datapump diagnostic data (SPXDIAG), such as data rate, and (v) handshake state (HSTS) with timestamp, which can be performed via host DGC application 318, in real time.

FIG. 4A illustrates control byte definition 400 for the diagnostic channel control of FIG. 3, according to one embodiment of the present invention. In one embodiment, the protocol exercised in between host DGC application 318 and device DGC server 304 is a variation of the ITU V.80 Recommendation for in-band command protocol with the control byte being preceded by an <EM> escape character or 19h. The control byte may be defined in the format shown in FIG. 4A. Start indicator 402 signals, e.g. to USB device 340, whether to start or stop a specific logical DGC channel indicated in logical channel ID 404.

FIG. 4B illustrates logical channel identifications 410 for control byte definition 400, according to one embodiment of the present invention. For example, logical channel ID 404 may include the $01 table value 414, which can be indicative of initiating a logical DGC channel for digital call progress (DCP); logical channel ID 404 may include the $02 table value 416, which can be indicative of initiating a logical DGC channel for constellation eye pattern (or SoftEye); logical channel ID 404 may include the $03 table value 418, which can be indicative of initiating a logical DGC channel for memory read/write monitor (MemMon); logical channel ID 404 may include the $04 table value 420, which can be indicative of initiating a logical DGC channel for datapump diagnostic data (SPXDIAG); and logical channel ID 404 may include the $05 table value 422, which can be indicative of initiating a logical DGC channel for handshake state (HSTS) with timestamp. As further shown, additional logical DGC channels can be initiated using the $00 table value 412, the $06-$18 table values 424, the $19 table values 426 and the $1A-$7F table values 428. In order to distinguish between the <EM> character and a raw data byte of $19, the raw data byte will be padded to transmit twice instead of once. The host application must remove the extra data byte upon the reception of double <EM><EM>.

FIG. 4C illustrates example exchange 450 between USB host 302 and USB device 304 for establishing logical DGC channels, according to one embodiment of the present invention. In one embodiment, a control byte is issued by USB host 302, at step 452, which is a request to establish a logical DGC channel for digital call progress (DCP), e.g. host DGC application 318, as indicated by <EM><01>. In return, USB device 304, e.g. device DGC server 304, echoes back the <EM><01> command to acknowledge the command and also to signify to USB host 302 that any subsequent data bytes will be from the specified logical channel, and data XX associated with digital call progress (DCP) will follow. In one embodiment, DGC channels are independent from one another. In other words, any one or multiple channels can be enabled or disabled in any order. After a logical DGC channel is established between USB device 304 and USB host 302, device DGC server 304 communicates with host DGC application 318 through the logical DGC channel. Filter driver 312 directs diagnostic information on the DGC logical channel to host DGC application 318. Further, filter driver 312 receives information directly from host DGC application 318, without travelling through CDC driver 314, for sending to device DGC server 304. As a result, USB device 304 remains CDC compliant while supporting custom features without degrading the data pipes.

Next, while digital call progress (DCP) is underway, in one embodiment, a control byte is issued by USB host 302, at step 462, which is a request to establish a logical DGC channel for handshake state (HSTS) with timestamp, as indicated by <EM><05>. In return, while data XX associated with digital call progress (DCP) is being communicated, USB device 304 echoes back the <EM><05> command to acknowledge the command, and data YY associated with digital call progress (DCP) will follow. As shown in step 462, the logical channel may thereafter communicate data XX associated with digital call progress (DCP) by issuing <EM><01> to signify that data XX associated with digital call progress (DCP) will follow.

Next, in one embodiment, a control byte is issued by USB host 302, at step 472, which is a request to terminate the logical DGC channel for digital call progress (DCP), as indicated by <EM><81>, where start indicator 402 is set to "1" and logical channel ID 404 is "$01". As a result, the DCP feature is terminated, the last few bytes of the data XX associated with digital call progress (DCP) are transmitted, and <EM><05> signifies that data YY associated with handshake state (HSTS) with timestamp will follow. Thereafter, at step 482, a control byte is issued by USB host 302, which is a request to terminate the logical DGC channel for handshake state (HSTS) with timestamp, as indicated by <EM><85>, where start indicator 402 is set to "1" and logical channel ID 404 is "$05". As a result, the DGC feature is terminated and the last few bytes of the data YY associated with handshake state (HSTS) with timestamp are transmitted.

From the above description of the invention it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of communicating diagnostic information between a Universal Serial Bus (USB) host and a USB device, the USB host including a host USB controller, a main driver and a host main application, the method comprising:
   establishing a data pipe in a data class interface between the USB host and the USB device for data communication;
   establishing a diagnostic information pipe in the data class interface between the USB host and the USB device for diagnostic information communication;
   monitoring the data class interface between the host USB controller and the main driver using a filter driver;
   intercepting the diagnostic information in the diagnostic information pipe of the data class interface using the filter driver;
   directing the diagnostic information intercepted by the filter driver to a host diagnostics application without travelling through the main driver;
   directing the data in the data pipe of the data class interface to the main driver for communication to the host main application;
   receiving information from the host diagnostics application by the filter driver without travelling through the main driver; and
   directing the information from the host diagnostics application by the filter driver to the USB device.

2. The method of claim 1, wherein the USB device is an analog modem device.

3. The method of claim 2 further comprising:
   issuing a command to enable one of a plurality of diagnostic features.

4. The method of claim 3, wherein the plurality of diagnostic features include digital call progress, constellation eye pattern memory read/write monitor, datapump diagnostic data and handshake state with timestamp.

5. The method of claim 3, the diagnostic information in the diagnostic information pipe includes information relating to at least two of plurality of diagnostic features.

6. The method of claim 1, wherein the USB device is an audio device.

7. The method of claim 1, wherein the USB device is DSL device.

8. A Universal Serial Bus (USB) host for communication of diagnostic information with a USB device, the USB host comprising
   a host USB controller;
   a main driver;
   a host main application in communication with the main driver;
   a filter driver interposed between the host USB controller and the main driver; and
   a host diagnostics application in communication with the filter driver;
   wherein the host is configured to establish a data pipe in a data class interface with the USB device for data communication, the host is further configured to establish a diagnostic information pipe in the data class interface for diagnostic information communication;
   wherein the filter driver is configured to monitor the data class interface, to intercept the diagnostic information in the diagnostic information pipe of the data class interface, to direct the diagnostic information intercepted by the filter driver to the host diagnostics application without travelling through the main driver, to direct the data in the data pipe of the data class interface to the main driver for communication to the host main application, to receive information from the host diagnostics application by the filter driver without travelling through the main driver, and to direct the information from the host diagnostics application by the filter driver to the USB device.

9. The USB host of claim 8, wherein the USB device is an analog modem device.

10. The USB host of claim 9, wherein the USB host is further configured to issue a command to enable one of a plurality of diagnostic features.

11. The USB host of claim 10, wherein the plurality of diagnostic features include digital call progress, constellation eye pattern memory read/write monitor, datapump diagnostic data and handshake state with timestamp.

12. The USB host of claim 10, the diagnostic information in the diagnostic information pipe includes information relating to at least two of plurality of diagnostic features.

13. The USB host of claim 8, wherein the USB device is an audio device.

14. The USB host of claim 8, wherein the USB device is DSL device.

15. A Universal Serial Bus (USB) system for communication of diagnostic information, the USB system comprising
   a USB device including:
      a device diagnostic control server;
      a device USB driver in communication with the device diagnostic control server;
   a device USB controller in communication with the device USB driver;
   a USB host including:
      a host USB controller;
      a main driver;
      a host main application in communication with the main driver;
      a filter driver interposed between the host USB controller and the main driver;
      a host diagnostic application in communication with the filter driver;
   a data class interface between the host USB controller and the device USB controller;
   wherein the host is configured to establish a data pipe in the data class interface with the USB device for data communication, the host is further configured to establish a diagnostic information pipe in the data class interface for diagnostic information communication;
   wherein the filter driver is configured to monitor the data class interface, to intercept the diagnostic information in the diagnostic information pipe of the data class interface from the device diagnostic control server, to direct the diagnostic information intercepted by the filter driver to the host diagnostics application without travelling through the main driver, to direct the data in the data pipe of the data class interface to the main driver for communication to the host main application, to receive information from the host diagnostics application by the filter driver without travelling through the main driver, and to direct the information from the host diagnostics application by the filter driver to the USB device.

16. The USB system of claim 15, wherein the USB device is an analog modem device.

17. The USB system of claim 16, wherein the USB host is further configured to issue a command to enable one of a plurality of diagnostic features.

18. The USB system of claim 17, wherein the plurality of diagnostic features include digital call progress, constellation eye pattern memory read/write monitor, datapump diagnostic data and handshake state with timestamp.

19. The USB system of claim 17, the diagnostic information in the diagnostic information pipe includes information relating to at least two of plurality of diagnostic features.

20. The USB system of claim 15, wherein the USB device is an audio device.

* * * * *